United States Patent [19]

Mima et al.

[11] 4,302,783
[45] Nov. 24, 1981

[54] METHOD AND APPARATUS FOR RECORDING AND REPRODUCING A PLURALITY OF BITS ON A MAGNETIC TAPE

[76] Inventors: Soichiro Mima; Hiroshi Matsushima; Yasuharu Shimeki; Nobuyoshi Kihara, all of No. 1006, Oaza Kadoma, Kadoma City, Osaka, Japan

[21] Appl. No.: 100,344

[22] Filed: Dec. 5, 1979

Related U.S. Application Data

[63] Continuation of Ser. No. 911,260, May 31, 1978, abandoned.

[30] Foreign Application Priority Data

Jun. 1, 1977 [JP] Japan ................................ 52-65010

[51] Int. Cl.$^3$ .............................................. G11B 5/02
[52] U.S. Cl. ........................................ 360/47; 360/27; 360/76
[58] Field of Search ..................... 360/22, 25, 26, 27, 360/47, 76

[56] References Cited

U.S. PATENT DOCUMENTS

| | | | |
|---|---|---|---|
| 2,628,346 | 2/1953 | Burkhart | 360/47 |
| 2,813,259 | 11/1957 | Burkhart | 360/47 |
| 2,937,239 | 5/1960 | Garber, Jr. et al. | 360/76 |
| 3,185,970 | 5/1965 | Cromleigh et al. | 360/26 |
| 3,217,329 | 11/1965 | Gabor | 360/47 |
| 3,277,453 | 10/1966 | Michel | 360/47 |
| 3,303,482 | 2/1967 | Jenkins | 360/47 |
| 3,320,590 | 5/1967 | Star | 360/47 |
| 3,761,903 | 9/1973 | Bird, Jr. et al. | 360/47 |

FOREIGN PATENT DOCUMENTS

762699 12/1956 United Kingdom ................. 360/27

Primary Examiner—Bernard Konick
Assistant Examiner—Donald McElheny, Jr.
Attorney, Agent, or Firm—Lowe, King, Price & Becker

[57] ABSTRACT

At least one bit of a digital signal including a plurality of bits to be simultaneously recorded on a plurality of tracks of a magnetic tape, is recorded on at least two tracks located at opposite sides with respect to a reference track. The reference track carries a reference signal utilized for producing a synchronous signal with which the plurality of bits are reproduced in synchronization. When reproducing, a.c. signals derived from the two corresponding tracks having the simultaneously recorded bits are added to each other whereby the phase difference of the plurality of bits with respect to the reference signal is compensated while drop out phenomenon is reduced.

10 Claims, 9 Drawing Figures

METHOD AND APPARATUS FOR RECORDING AND REPRODUCING A PLURALITY OF BITS ON A MAGNETIC TAPE

This is a continuation of application Ser. No. 911,260, filed May 31, 1978 now abandoned.

FIELD OF THE INVENTION

This invention generally relates to a method and apparatus for recording and reproducing a signal on a magnetic tape. More specifically the present invention relates to a method and an apparatus for simultaneously recording and reproducing a plurality of bits included in a digital signal.

BACKGROUND OF THE INVENTION

Since digital signals are advantageous for reducing noise and obtaining high s/n (ratio of signal to noise), digital signals are widely used in various devices. When recording an analog signal, such as a sound signal, on a magnetic tape, it is more advantageous to record a digital signal obtained from the analog signal than to directly record the analog signal for this reason. An analog signal is converted into a digital signal, such as a PCM (pulse code modulation) signal and then the PCM signal is recorded on a magnetic tape. When reproducing, the recorded PCM signal is detected by reproducing heads and then the PCM signal is reconverted into an analog signal.

In such a device, a series of groups of bits (a group of bits is referred to as a word hereinafter) is produced by sampling the magnitude of the analog signal. When recording, a plurality of bits included in one word are simultaneously recorded via a plurality of recording heads on a magnetic tape. Accordingly, when reproducing the digital signal, a plurality of simultaneously recorded bits should be scanned and reproduced by a plurality of reproducing heads simultaneously. If these bits of a word are not simultaneously reproduced, the reconverted analog signal may include noise and be distorted.

The reason distortion and noise occur in the reconstructed analog signal is that there is divergence in the relative position of the reproducing heads and the recorded portions on the magnetic tape. The divergence of the heads is called skew. There are two types of skews which respectively occur because of different reasons. One is called "static skew" while the other is called "dynamic skew". The static skew is usually occurs because of lack of uniformity in the positions and the azimuth of a plurality of head gaps. The dynamic skew usually occurs because of the unstable movement of the magnetic tape. The static skew can be readily corrected by modifying the positions and azimuths of the head gaps. However, the dynamic skew can not be corrected unless the movement of the magnetic tape is perfectly regulated. Perfect control of the movement of a magnetic tape can not be expected and thus dynamic skew is inherent in such an apparatus.

In a conventional type of apparatus, an electrical circuit for compensating for the skew is usually employed. Such an electrical circuit is called a deskew circuit and is usually complex in construction. For instance, a deskew circuit has a plurality of delay circuits corresponding to each track for compensating for the static skew. In another deskew circuit, each bit signal is modulated by given modulation technique, such as phase modulation and frequency modulation, so that each modulated signal can provide a clock signal whereby bit data are recorded and reproduced in synchronization. Although such deskew circuit is workable for compensating for the skew, compensation for drop outs (omission of reproduction) of a plurality of bits is not readily achieved.

SUMMARY OF THE INVENTION

The present invention contemplates overcoming the above mentioned drawbacks of the conventional type of apparatus for recording and reproducing a digital signal. In order to compensate for the skew (not only the dynamic skew, but also the static skew) at least one signal corresponding to one bit is simultaneously recorded on at least two tracks on a magnetic tape via at least two heads and then the signals recorded on the tracks are reproduced by corresponding heads while the reproduced signals are added to each other for offsetting the phase difference of the signals with respect to the phase of a concurrently recorded and reproduced reference signal. For recording the same signal on a plurality of tracks on a magnetic tape and for adding the reproduced signals derived from a plurality of tracks to each other, predetermined heads are electrically connected to each other. The distance between tracks on which the same signal is recorded and the arrangement of tracks are so determined that suitable added signals are obtained.

Therefore, it is an object of the present invention to provide an improved method and apparatus for recording and reproducing a plurality of bits of a digital signal in which the influence of skew is effectively compensated while drop out of bits is substantially reduced.

BRIEF DESCRIPTION OF THE DRAWINGS

The foregoing objects and other objects and the features of the present invention will be readily apparent from the following detailed description taken in conjunction with the accompanying drawings in which.

DETAILED DESCRIPTION OF THE PREFERRED EMBODIMENTS

Figure 1:
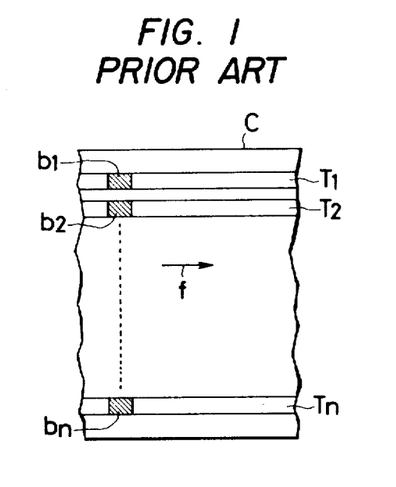
FIG. 1 shows schematic tracks on a magnetic tape which is utilized in a conventional apparatus.

Before discussing the preferred embodiments, a discussion of the prior art will be made taken in conjunction with FIGS. 1 and 2. As shown in FIG. 1 a plurality of bits included in a word of a digital signal are simultaneously recorded on a magnetic tape "c" via a plurality of recording heads (not shown). As well known, the magnetic tape "c" is driven by an electric motor so that the tape "c" slides on the surfaces of magnetic heads at a predetermined velocity. Since a group of bits of one word is recorded simultaneously and then reproduced simultaneously, a multi-type head (which is referred to as a multi head hereinafter) including a plurality of heads is provided. Although it is possible to use the same multi head for both recording and reproducing, it is advantageous to employ two independent multi heads.

b1, b2 ... bn indicate positions where bits are simultaneously recorded. As the tape "c" moves in a direction indicated by a arrow "f", a next group of bits (not shown) of another word is recorded at an adjacent position so that a plurality of tracks T1, T2 ... Tn are formed on the magnetic tape "c". These tracks T1 to Tn are equidistantly spaced and parallel.

Figure 2:
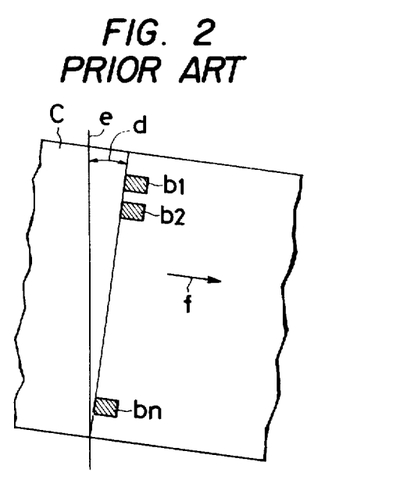
FIG. 2 shows a relationship between bits recorded on tracks and the gap position of heads in a conventional apparatus.

FIG. 2 shows schematically the relationship between the positions of the recorded bits b1 ... bn and the central positions of the reproducing head gaps. A line "e" in FIG. 2 indicates the control positions of the reproducing head gaps of the multi head utilized for reproducing the bits b1 ... bn. Because of the skew (static and dynamic skews) the positions of the bits do not accord with the central position of the multi head. The maximum skew is denoted by "d". This means, in a specific example shown in FIG. 2, that the bits which locate upper positions of the tape "c" move on the corresponding head gaps before the bits which locate lower positions of the tape "c" move on the same.

Assuming that the frequency of the digital signal to be recorded is 40 k Hz, and the tape speed is 38 cm/sec, the wave length of the signal on the magnetic tape "c" is approximately 10 μm. Therefore, in order to distinguish the digital signal irrespectively of noise the maximum skew "d" should be smaller than ±2−3 μm. Generally speaking, the waving of the tape, i.e. the fluctuation in speed of the magnetic tape, is more than tens of μm.

Figure 3:
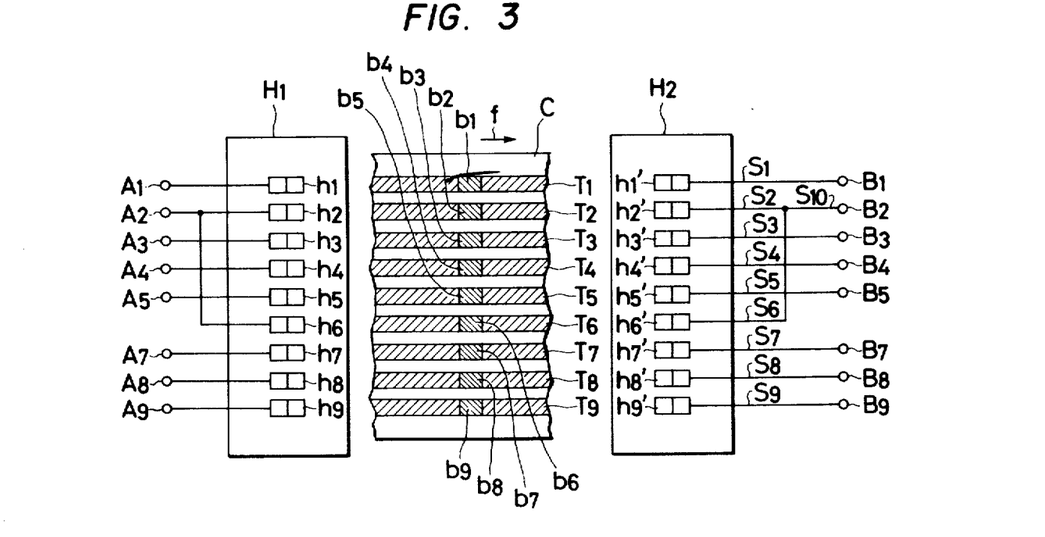
FIG. 3 shows schematically the relationship between tracks recorded on a magnetic tape and recording and reproducing heads for the sake of discussion of the degrees of reduction of phase differences.

Reference is now made to FIG. 3 which shows an arrangement of recording heads, reproducing heads and a magnetic tape. The arrangement shown is provided for the sake of discussion of the degree of the reduction of phase differences when same reproduced signals are added to each other.

The first to ninth recording heads h1 to h9, which are equidistantly spaced and are aligned transversely to the direction of the magnetic tape, are included in a recording multi head H1 while first to ninth reproducing heads, which are arranged in the same manner, are included in a reproducing multi head H2. Input terminals A1 to A5 are respectively connected to recording heads h1 to h5 while input terminals A7 to A9 are respectively connected to recording heads h7 to h9. One recording head h6 is connected to the input terminal A2. Output terminals B1, B2, B3, B4, B5, B7, B8 and B9 are respectively connected to the reproducing heads h1' to h9' in the same manner as the input terminals i.e. two reproducing heads h2' and h6' are connected to the output terminal B2. When signals are fed to the input terminals A1 to A9, as the magnetic tape "c" slides on the head gaps of the recording heads h1 to h9 in a direction indicated by arrow "f", first to ninth tracks T1 to T9 are produced on the magnetic tape "c". Reference blocks b1 to b9 respectively indicate positions of recorded bits on the first to ninth tracks T1 to T9. Since the second and the sixth recording heads h2 and h6 are connected to each other, the same signals corresponding to the same bit are recorded on the second and sixth tracks T2 and T6. In other words, signals recorded on the positions b2 and b6 are the same.

When reproducing, the signals recorded on positions b1 to b9 are respectively scanned by reproducing heads h1' to h9' so that each reproduced heads h1' to h9' generates first to ninth reproducing signals S1 to S9. Since the output terminal B2 is connected to both the second and sixth reproducing heads h2' and h6', an added signal S10 is obtained, by adding the second and sixth reproduced signals S2 and S6, at the output terminal B2.

An analysis of the influence of the skew will be made hereinafter. Assuming the digital signal is a FM (frequency modulation) signal, the output signals reproduced by reproducing heads assume one of two frequencies of sine waves. Therefore, when all of the bits are identical data, the output signals should be the same sine waves at the same frequency. A reference signal utilized for obtaining a synchronous signal with which reproduction of bits is performed in synchronization, is recorded on a position b5 of the fifth track T5 located at the midway position in a transverse direction of the magnetic tape "c".

The reference signal is expressed by $\sin \omega t$. Although the same signal expressed by $\sin \omega t$ is recorded on positions b1 to b9 of all tracks T1 to T9, because of the skew, a reproduced signal S1 derived from the position b1 of the first track T1 is expressed by $\sin(\omega t + \theta)$. Although the static skew is corrected by adjusting the azimuths of the reproducing heads, because of the dynamic skew, the value of $\theta$ varies between a range expressed by $-\theta \sim +\theta_1$. Hereinafter the dynamic skew expressed by $\theta$ is referred to as a phase difference (phase difference between a reproduced signal and a reproduced reference signal).

Suppose the output signal S9 obtained at the terminal B9 which corresponds to the signal recorded on a position b9 of the ninth track T9 is expressed by $\sin(\omega t + \theta')$, the output signal S9 has a phase difference having a magnitude equal to and polarity opposite to that of the output signal S1 obtained at the output terminal B1. Namely, the value of $\theta'$ varies within a range expressed by $+\theta_1 \sim -\theta_1$. Other reproduced signals, except the fifth reproduced signal S5, respectively have phase differences in the same manner. The magnitude of the phase difference is in proportion to the distance from the center track T5. The phase differences of each reproduced signals S2, S3, S4, S6, S7 and S8 derived from positions b2, b3, b4, b6, b7 and b8 are respectively $\pm \frac{3}{4}\theta_1$, $\pm(2/4)\theta_1$, $\pm \frac{1}{4}\theta_1$, $\mp \frac{1}{4}\theta_1$, $\mp(2/4)\theta_1$, $\mp \frac{3}{4}\theta_1$. Since the second recording head h2 is connected to the sixth recording head h6, the same signal is fed to both heads h2 and h6. When reproducing, since the second reproducing head h2' is connected to the sixth reproducing head h6', the output signals S2 and S6 of the heads h2' and h6' are added to each other. Therefore, an added signal S10 is obtained at the output terminal B2 wherein the added signal S10 is expressed by the following equation:

$$a \sin(\omega t + \theta'') = \sin(\omega t + \theta) + \sin(\omega t + \theta') \quad (1)$$

$$= 2\sin\left(\omega t \frac{\theta + \theta'}{2}\right) \cos \frac{\theta - \theta'}{2}$$

wherein
sin ωt is a reference signal recorded at the position b5 of the track T5;
sin(ωt+θ) is the second reproduced signal obtained by the second reproducing head h2';
sin(ωt+θ') is the sixth reproduced signal obtained by the sixth reproducing head h6'.

From the equation (1) the following equations are derived:

$$a = 2\cos\frac{\theta - \theta'}{2} \quad (2)$$

$$\theta'' = \frac{\theta + \theta'}{2} \quad (3)$$

Since the phase difference of the signal S2 is $\pm\frac{3}{4}\theta_1$ and the phase difference of the signal S6 is $\mp\frac{1}{4}\theta_1$, the value of $\theta''$ of the equation (3) is expressed by the following equation:

$$\theta'' = \frac{\pm\frac{3}{4}\theta_1 \mp\frac{1}{4}\theta_1}{2} = \pm\frac{1}{4}\theta_1 \quad (4)$$

The value of $\theta''$ expressed by the equation (4) is same as that of the output signal S6 in absolute values. Accordingly the phase difference of the signal S6 is not reduced at all. In order to reduce the phase difference of each reproduced signal by adding two independently reproduced signals, the distance between the fifth track T5 and the sixth track T6 should be greater than one third of the distance between the fifth track T5 and the second track T2. In other words, the relationship between the two distances must be such that the larger distance is smaller than three times of the other distance. Since each track T1 to T9 are equidistantly spaced, the ratio of the above mentioned distance is just ⅕. From the foregoing, it will be understood that the ratio of the two distances should be larger than ⅓ and smaller than 3.

Figure 4:
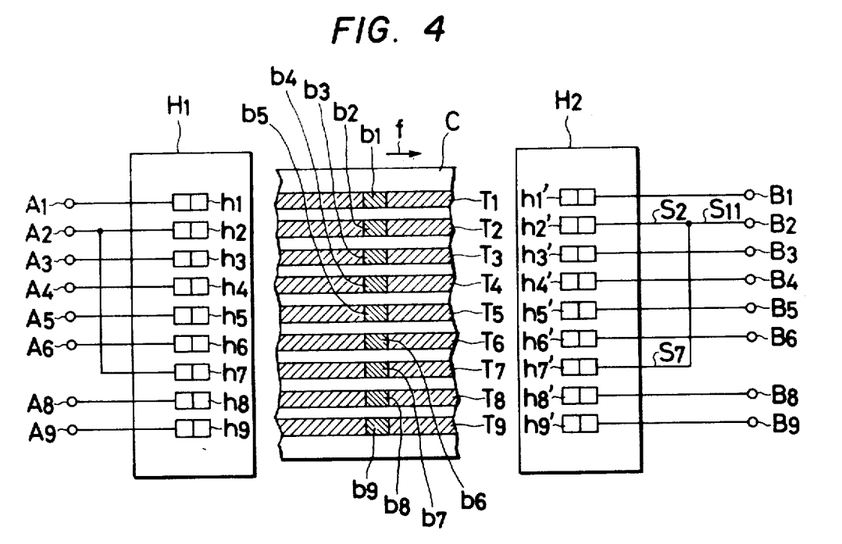
FIG. 4 shows schematically the relationship between recorded traks on the magnetic tape and recording and reproducing heads of the first preferred embodiment according to the present invention.

Hence, reference is now made to FIG. 4 which shows a first preferred embodiment according to the present invention. The arrangement of the recording multi head H1, the reproducing multi head H2 and the magnetic tape "c" is the same as that shown in FIG. 3 except that second and seventh recording heads h2 and h7 are connected to each other while second and seventh reproducing heads h2' and h7' are connected to each other.

An added output signal S11 is obtained at the terminal B2 which is connected to the reproducing heads h2' and h7', by adding the reproduced signals S2 and S7. Therefore, the value of $\theta''$ of the equation (3) is as follows since the phase difference $\theta$ and $\theta'$ of the each signal S2 and S7 are $\pm\frac{3}{4}\theta_1$ and $\mp(2/4)\theta_1$.

$$\theta'' = \frac{1}{2}(\pm\frac{3}{4}\theta_1 \mp(2/4)\theta_1) = \pm\frac{1}{8}\theta_1 \quad (5)$$

From the equation (5) it is apparent that the value of $\theta''$ is smaller than those of the $\theta$ and $\theta'$ in absolute value. This means that the phase differences of each reproduced signals S2 and S7 obtained by head h2' and h7' are reduced.

Figure 5:
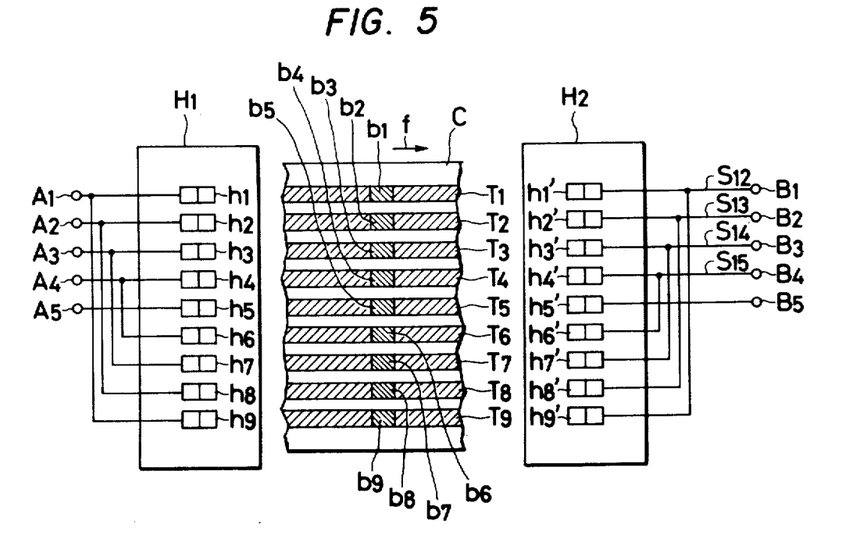
FIG. 5 shows schematically the relationship between tracks recorded on a magnetic tape and recording and reproducing heads of a second preferred embodiment according to the present invention.

FIG. 5 illustrates a second preferred embodiment of the present invention. The arrangement shown in FIG. 5 is the same as that shown in FIG. 4 except that sixth to ninth recording heads h6, h7, h8 and h9 are respectively connected to fourth to first heads h4, h3, h2 and h1 while sixth to ninth reproducing heads h6', h7', h8' and h9, are respectively connected to fourth to first heads h4', h3', h2' and h1'.

With this provision the first and ninth track T1 and T9 are fed with the same input signal while other pairs of tracks T2 and T8, T3 and T7, T4 and T6 are respectively fed with the same input signal. The track T5 located at the midway position of the magnetic tape "c" is fed with a reference signal. This means that the positions of b6, b7, b8 and b9 are symmetrical to the positions b4, b3, b2 and b1 with respect to the position b5 of the fifth tract T5. Therefore the following equation is obtained.

$$\theta + \theta' = 0 \quad (6)$$

wherein
$\theta$ is the phase difference of the first reproduced signal S1; and
$\theta'$ is the phase difference of the ninth reproduced signal S9.

The equation (1) is rewritten in view of equation (6) as follows:

$$a \sin(\omega t + \theta'') = 2\cos\theta \sin \omega t \quad (7)$$

From equation (7), the following results are derived.

$$a = 2\cos\theta, \; \theta'' = 0$$

This means that the added signal S12 includes no phase difference. Not only the phase difference, i.e. the dynamic skew, but any static skew $+\theta_2$ and $-\theta_2$, can be compensated for since the skew $\theta$ including both skews of the signal S1 varies between $+\theta_1$ and $+\theta_2$ while the skew $\theta'$ of the signal S9 varies between $-\theta_1$ and $-\theta_2$. In the same manner, other added signals S13, S14 and S15 include no phase differences.

As readily be understood, the equation (2) i.e. $a=2\cos(\theta - \theta'/2)$ indicates the peak value of the added signal. If "a" of the equation (2) is substituted with 1, $\theta - \theta' = \frac{2}{3}\pi$ while if "a" of the equation (2) is substituted with 0, $\theta - \theta' = \pi$. This means that when the relationship between the phase differences $\theta$ and $\theta'$ are in the above mentioned conditions, the peak value of the output signal of the added signal is the same as that of the original reproduced signal or zero. Therefore, the phase difference $(\theta - \theta')$ between the signals to be added to each other should be less than $\frac{2}{3}\pi$.

Assuming the phase difference of the reproduced signals S1 to S4 at $\pm 60°$, $\pm 45°$, $\pm 30°$, $\pm 15°$, the phase difference of the reproduced signals S6 to S9 are respectively $\pm 15°$, $\pm 30°$, $\pm 45°$ and $\pm 60°$. Therefore the added signal obtained at terminal B1 is expressed by sin ωt which is the same as that of the fifth signal S5 obtained at the terminal B5 since $a=2\cos 60° = 1$, and $\theta'=0$ by the equations (2) and (3). In the same manner other added signals obtained at the terminals B2, B3 and B4 are expressed by $\sqrt{2} \sin \omega t$, $\sqrt{3} \sin \omega t$, 1.93 sin ωt. From the foregoing it is understood that the phase differences of all of the added signals are zero while the peak value of the added signal is below each reproduced signal when the phase difference between two signals to be added to each other is over ±60°.

As shown by the equation (2), since the peak value "a" of the added signal increases as the phase difference $(\theta - \theta')$ approaches zero, the magnitude of a signal derived by the addition of two signals obtained from any two tracks will diminish with the increase of distance between the tracks.

Figure 6:
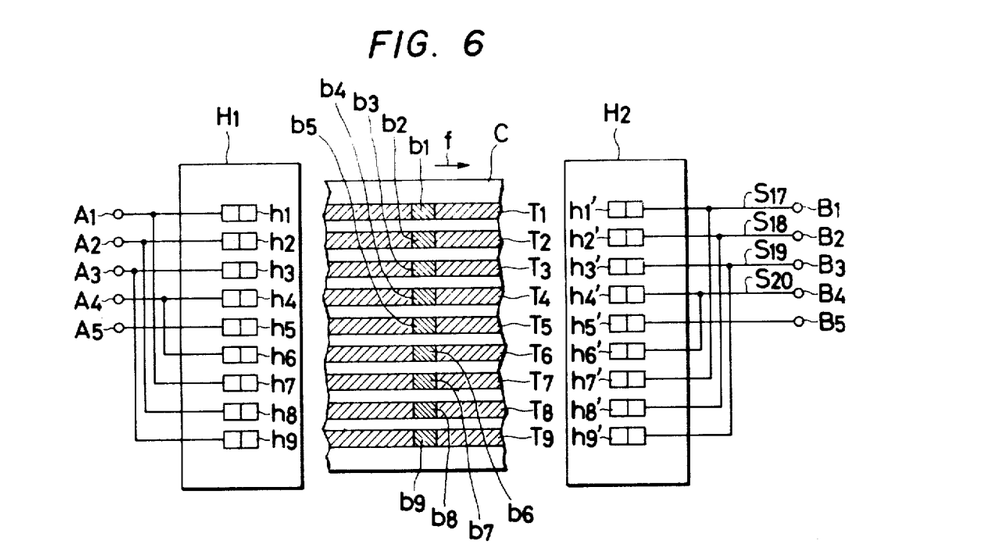
FIG. 6 shows schematically the relationship between tracks recorded on a magnetic tape and recording and reproducing heads of a third preferred embodiment according to the present invention.

FIG. 6 illustrates a third embodiment of the present invention. The arrangement shown in FIG. 6 is the same as that shown in FIGS. 3, 4 and 5 except that the connections of the recording heads and the reproducing heads. Recording heads h6, h7, h8 and h9 are respectively connected to other recording heads h4, h1, h2 and h3 while reproducing heads h6', h7', h8' and h9' are respectively connected to other reproducing heads h4', h1', h2' and h3'. For the sake of analysis, suppose all of the input terminals A1 to A5 of the recording multi head H1 are fed with the same input signals expressed by sin ωt. The reproducing heads h1' to h9' are arranged to reproduce signals S1 to S9 from the corresponding tracks T1 to T9.

Assuming the phase differences of the reproduced signals S1 to S4 with respect to the reference signal S5 (sin ωt) recorded on the fifth the track T5 are ±60°, ±45°, ±30°, ±15°, the phase differences of the other signals S5 to S9 are ±15°, ±30°, ±45°, ±60°. An added signal S17 derived by the addition of the signals S1 and S7, is obtained at the terminal B1. The values of "a" and $\theta''$ of the signal S17 are obtained by the equations (2) and (3) as follows:

$$a = \sqrt{2}, \theta'' = \pm 15°$$

Therefore, the added signal S17 is expressed by $$S17 = \sqrt{2} \sin(\omega t \pm 15°) \tag{8}$$

In the same manner other added signals S18, S19, and S20 obtained at the output terminals B2 and B4 are respectively expressed by:

$$S18 = \sqrt{2} \sin \omega t \tag{9}$$

$$S19 = \sqrt{2} \sin(\omega t \mp 15°) \tag{10}$$

$$S20 = 1.93 \sin \omega t \tag{11}$$

As shown by the above equations (8) to (11), although the maximum phase difference of the added signals is ±15°, the peak values of the added signals are over $\sqrt{2}$. In this method of addition of the reproduced signals, the peak value of an added signal will be below that of an independently reproduced signal only when the phase difference between two reproduced signals is over ±80°.

From the foregoing it will be clearly understood that by means of recording the same signal on any two tracks on a magnetic tape and adding two signals reproduced by two heads to each other, the phase difference of the added signal is the average of the phase difference of the indepenently reproduced signals while the peak value of the added signal is the sum of the vectors of the two independent signals. Therefore, when two signals of two tracks which position at opposite sides with respect to a reference track are added to each other, the phase differences of the two signals are offset to a given extent since the directions of the phase differences of the two signals are opposite to each other. When the distance (which is longer and/or equal to the other distance) between a track and the reference track is less than three times of the distance between the other track and the reference track, the phase difference of the added signal is smaller in absolute value than the smaller phase difference between two independent signals. However, if the former distance is over three times of the latter, the phase difference of the added signal is smaller in absolute value than the maximum phase difference between two independent signals, but larger than minimum thereof.

Furthermore, if the two tracks are located symmetrically with respect to the reference track as shown in FIG. 5, the phase difference of the added signal will equal zero. Therefore, when it is desired to reduce the phase difference of an added signal, the arrangement shown in FIG. 5 is most suitable.

On the other hand, when it is desired to obtain almost same peak values of the added signals, it is preferable to equidistantly space the two tracks as shown in FIG. 6. However, with the arrangement of FIG. 6, the phase difference of the added signal can not be zero. When it is desired to obtain a larger peak value of the added signal, it is preferable to add two signals of two tracks located as close together as possible. Therefore, there may be provided other arrangements except those shown in FIG. 5 and FIG. 6. It is to be noted that a suitable arrangement of connections of the recording and reproducing heads is selected in accordance with the importance of either the reduction of the phase difference or the increase of the peak value.

In the above mentioned embodiments, the same signal is recorded on two tracks. However, the same signal can be recorded on more than two tracks while independently reproduced signals are added in the same manner.

The method of recording the same signal on a plurality of tracks and reproducing a single signal by adding the reproduced signals is considerably advantageous for decreasing the influence of a drop out of a signal. Assuming the error ratio of a signal of one track due to drop out phenomenon is "E", the error ratio of an added signal obtained by adding two signals on two tracks is $E^2$. This means that the error ratio is extremely reduced. However, when the two track are adjacent to each other, both of the signals recorded on the two tracks are apt to be simultaneously dropped out because of a speck of dust. When a speck of dust is attached on the surface of a magnetic tape, signals can not be recorded on a portion the maximum diameter of which is approximately 500 μm generally. Consequently, if the two tracks are spaced from each other more than 500 μm, a simultaneous drop out is prevented and thus the error ratio of the added signal is very small as mentioned before.

As described before, the recorded signals are simultaneously reproduced by reproducing heads in synchronization with a synchronous signal which is produced based on the reference signal. Therefore, if the reference signal is dropped out, other signals are erroneously detected. From this reason the reference signal should be protected from drop out phenomenon in a most safe manner.

Figure 7:
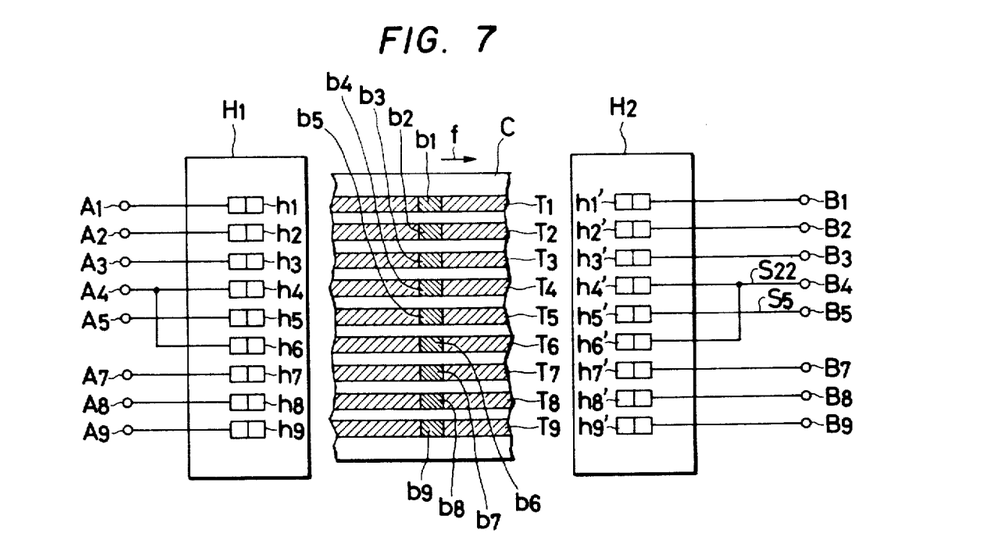
FIG. 7 shows schematically the relationship between tracks recorded on a magnetic tape and recording and reproducing heads of a fourth preferred embodiment according to the present invention.

Hence, reference is made to FIG. 7 which shows a fourth embodiment of the present invention. The arrangement of the fourth embodiment is same as those previously shown except that fourth and sixth recording heads h4 and h6 are connected to each other while fourth and sixth reproducing heads h4' and h6' are connected to each other. A reference signal is arranged to be recorded on the fourth and sixth tracks T4 and T6 via an input terminal A4 and fourth and sixth recording heads h4 and h6. The same reference signals recorded on the portions b4 and b6 of the tracks T4 and T6 are reproduced by the reproducing heads h4' and h6' and thus an added signal S22 is obtained at an output terminal B4. As mentioned hereinabove, the error ratio of the added signal is considerably small since the same signal is recorded on two tracks. The phase difference of the added signal S22 is the average of the phase differences of the two independently reproduced signals. Since the fourth and sixth tracks T4 and T6 are symmetrical with respect to the fifth track T5, the average of the phase differences is equal to that of the reproduced signal S5 obtained at the output terminal B5. With this provision, although the reference tracks are the fourth and sixth tracks T4 and T6, it can be thought as if the reference track is located at the fifth track T5. Therefore, when two signals other than signals S4 and S6 are added to each other, the phase difference of the added signal is reduced in the same manner as shown in FIGS. 4, 5 and 6. When the reference signal is recorded on three tracks, the phase difference of the added signal will be the same of the phase difference of a track which locates at the center of the three tracks. In this case the center position can be thought as the track on which the reference signal is recorded.

However, when the track width and track pitch is narrow, it is sometimes impossible to fulfil the before mentioned three requirements, viz. the ratio of the distances of the two tracks from the reference track; the symmetrical arrangement; and the distance between the two tracks. In such a case, it is preferable to record only the reference signal on tracks located at positions adjacent to the midway position of the tape width.

The reference signal in the previous embodiments may be a signal corresponding to a bit of a word signal. Since the reference signal is effectively protected from the drop out phenomenon, it is preferable to use the MSB (most significant bit) of a word signal.

Figure 8:
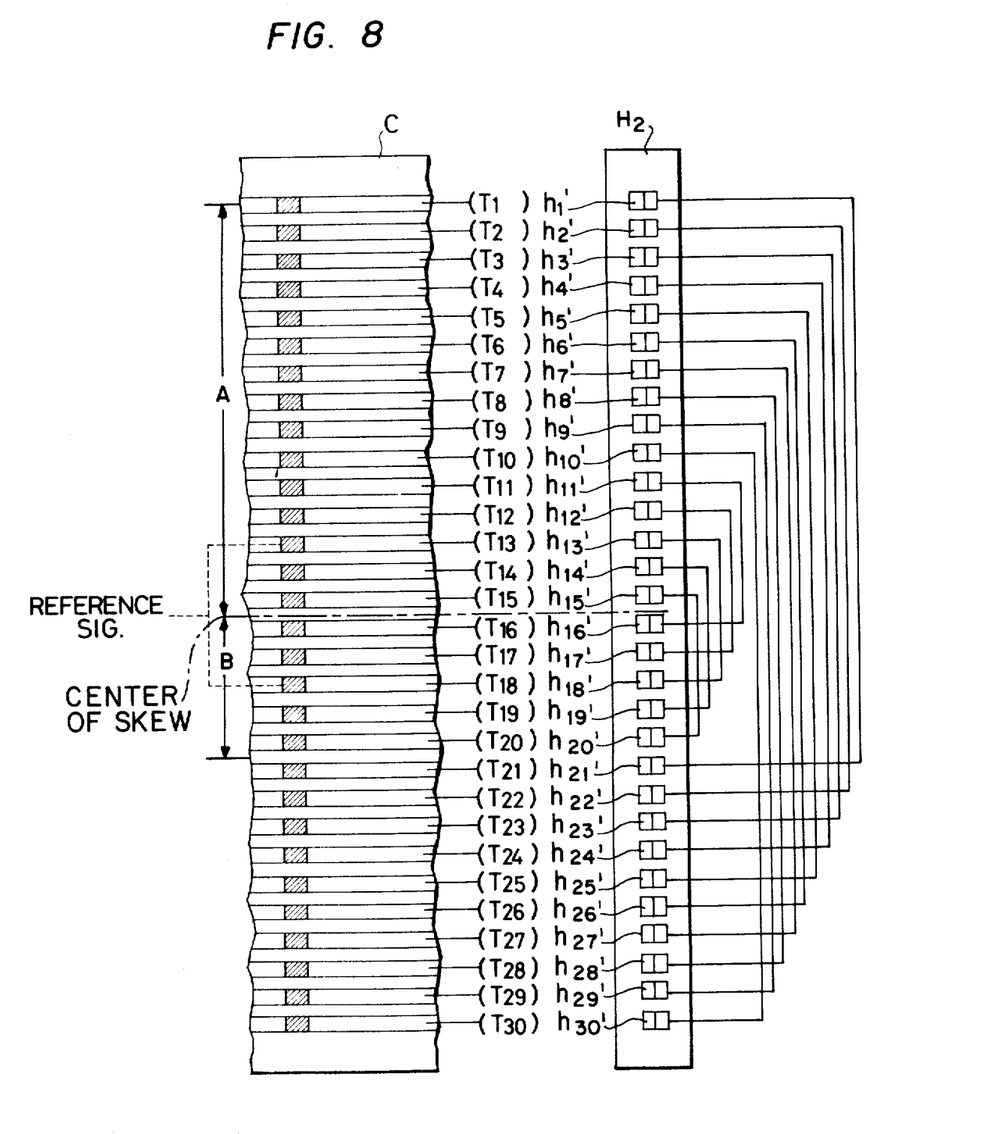
FIG. 8 shows a track pattern of a fifth preferred embodiment according to the present invention.

Hence, reference is now made to FIG. 8 which shows a fifth embodiment of the present invention. The track pattern contains 30 tracks T1 to T30. Accordingly 30 recording heads (not shown) and 30 reproducing heads (h1' to h30') are provided in which two of each recording heads and reproducing heads are respectively connected to each other. The connections of the heads are schematically shown by 15 lines, in FIG. 8, which connect reproducing heads h1' to h10' corresponding to tracks T1 to T10 to reproducing heads h21' to h30' corresponding to tracks T21 to T30 and reproducing heads h11' to h15' corresponding to tracks T11 to T15 to reproducing heads h16' to h20' corresponding to tracks T16 to T20.

The reference signal is a MSB signal of a word signal and is recorded on two tracks which are spaced from each other by more than 500 μm and are arranged symmetrically with respect to the center of the tape width. As shown by a dotted line the reference signal is recorded on the thirteenth and eighteenth tracks T13 and T18. This means that the center of the skew corresponds to the geometrical center of the tracks T13 and T18 and this center of skew is shown by a dotted line. With this provision the phase difference of the reference signal is compensated. Since the skews of the reproduced signals derived from the tracks which locate adjacent to the both edges of the magnetic tape "c", are relatively large, the same bit signal is recorded on two tracks such as tracks T1 and T21 in which the distance A between the first track T1 and the center of skew located at the midway position of the tracks T13 and T18, is less than 3 times the distance B between the twentyfirst track T21 and the center of skew, while the above mentioned former distance A is greater than one-third of the latter distance B. Since the same signal is recorded on these two tracks which are in the predetermined condition, and two signals are added to each other when reproduced, the skew of the added signal is less than that of independently reproduced signals. However, tracks which locate at about the center of the tape "c" can not be combined in the same manner fulfilling the above mentioned condition. Since the skew of signals derived from those tracks adjacent to the center of the tape "c" do not have relatively large phase difference, with respect to the reference signal, all that is required for these signals is drop out protection. Accordingly, two tracks such as tracks T14 and T19 which are separated from each other by more than 500 μm, are combined and thus these two tracks are fed with the same signal.

Fifteen bits of a word signal are respectively recorded on two tracks and thus two correspondingly reproduced signals are added to each other so that fifteen bits are reproduced.

The embodiment shown in FIG. 8 thus provides the reduction of the phase difference and the protection from drop out phenomenon simultaneously.

Figure 9:
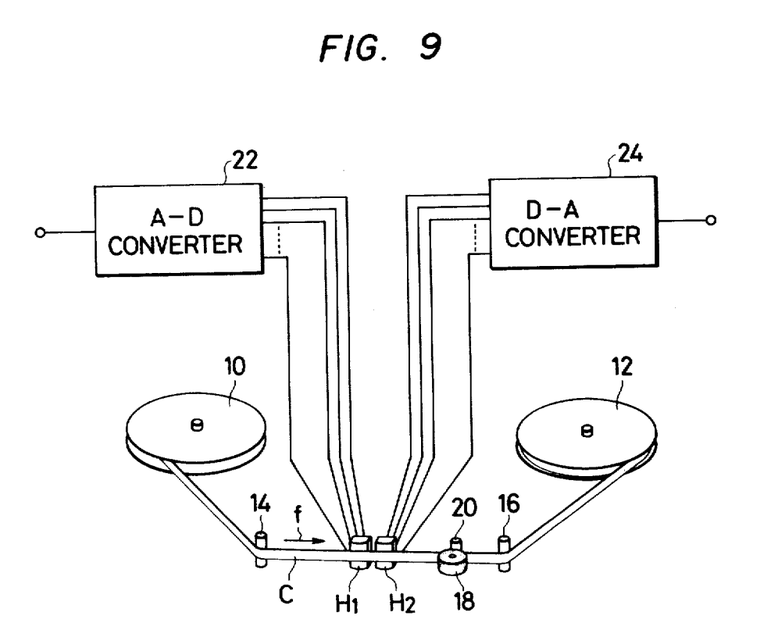
FIG. 9 shows a schematic view of a tape recorder according to the present invention.

FIG. 9 schematically illustrates a tape recorder according to the present invention. Two rotatable reels 10 and 12 are provided for supplying and winding a magnetic tape "c". The reels are arranged to rotate by means of an electric motor (not shown). The magnetic tape "c" is arranged to be driven at a predetermined speed by means of a capstan 18 and a roller 20. Guide rollers 14 and 16 are movable and rotatable so that suitable tension is provided for the magnetic tape "c". A recording multi head H1 which includes a plurality of recording heads aligned in a transverse direction of the magnetic tape and a reproducing multi head H2 having same construction are so arranged that the magnetic tape "c" slides on the head gaps (not shown) thereof. An A-D(analog to digital) converter 22 is connected to the recording multi head H1 while a D-A(digital to analog) converter 24 is connected to the reproducing multi head H2. With this provision, an analog signal fed to the input of the A-D converter 22 is converted into a plurality of bits which are respectively recorded on a plurality of tracks on the magnetic tape "c". The recorded bits are scanned by the reproducing heads and thus a plurality of bits are reproduced by same where the bits are fed to the inputs of the D-A converter 24. The D-A converter 24 produces an analog signal in accordance with the input bits.

From the foregoing it will be understood that according to the present invention, the static skew and the dynamic skew inherent to the reproduction of digital signals are effectively compensated and an electrical circuit such as a deskew circuit for reducing the influence of the skew is not necessary. Further, since at least two signals recorded on at least two separated tracks are added to each other, the omission of a signal due to drop out phenomenon is considerably decreased.

What is claimed is:

1. A method of recording and reproducing a plurality of bits of a digital signal on a plurality of tracks positioned in parallel on a magnetic medium arranged to slide on at least one multi head which includes a plurality of like heads transversely aligned with respect to the direction of the movement of said magnetic medium, each of said heads being spaced from an adjacent head by less than dust speck size, each head having a head gap which defines the width of each track, comprising the steps of:

simultaneously recording with common polarity each of said bits via two heads of said multi head in such a manner that each bit is recorded on two information tracks, said two information tracks for each bit being positioned at opposite sides with respect to the geometrical center of two of said heads, said reference signal being utilized for producing a synchronous signal with which said plurality of bits are reproduced in synchronization, said two information tracks for each bit being so spaced from each other by more than a predetermined distance corresponding to said dust speck size to eliminate drop out due to a possiblity of a dust speck occurring simultaneously on the same information tracks carrying the same bit signal, said two reference tracks also being spaced from each other by more than said predetermined distance to eliminate drop out due to a possibility of a dust speck occurring simultaneously on the reference tracks carrying the same reference signal, said two information tracks for each bit being spaced from said geometric center of said reference tracks by the distances A and B satisfying the relationship $\frac{1}{3}B<A<3B$ to reduce skew, some of said plurality of tracks, which are located in the vicinity of said geometrical center, being arranged such that said two tracks, carrying the same bit signal, either information bit or reference bit, are spaced apart by a constant distance, and having relationship therebetween such that a first bit signal is recorded on $n^{th}$ and $(n+a)^{th}$ tracks, a second bit signal is recorded on $(n-1)^{th}$ and $(n+a-1)^{th}$ tracks, a third bit signal is recorded on $(n-2)^{th}$ and $(n+a-2)^{th}$ tracks, and so on, wherein "n" is the order of a track adjacent to said geometrical center, counted from one end of said magnetic medium, and "a" is a positive integer;

reading each bit recorded on each track via each of said heads so that each of said heads produces an a.c. signal having a variable magnitude and phase characteristic;

adding vectorally said a.c. signals from said two heads which correspond to said two reference tracks; and     adding vectorally said a.c. signals from said two heads which correspond to said two information tracks for each of said plurality of bits.

2. An apparatus for recording and reproducing a plurality of bits of a digital signal on and from a magnetic medium comprising:

(a) means for driving said magnetic medium at a predetermined speed;

(b) a plurality of like recording heads the head gaps of which are aligned transversely with respect to the direction of the movement of said magnetic medium, each of said heads being spaced from an adjacent head by less than dust speck size, each of said head gaps defining the width of each track, a reference signal being recorded via two of said recording heads on reference tracks; each of said plurality of bits being recorded via two of said recording heads which are located at opposite sides with respect to the geometrical center of said two heads via which said reference signal is recorded, said two of said recording heads being electrically connected to each other for recording the same common polarity bit on two information tracks on said magnetic medium, said two heads for each bit being spaced from each other by more than a predetermined distance corresponding to said dust speck size to eliminate drop out caused by a possibility of a dust speck occurring simultaneously on the same information tracks carrying the same bit signal, said two heads for recording said reference signal being also spaced from each other by more than said predetermined distance to eliminate drop out due to a possibility of a dust speck occurring simultaneously on the reference tracks carrying the same reference signal, said information tracks being spaced from said geometrical center respectively by the distances A and B satisfying the relationship $\frac{1}{3}B<A<3B$ to reduce skew, some of said plurality of heads, which are located in the vicinity of said geometrical center, being arranged such that said two heads for recording the same bit signal are spaced apart by a constant distance, and having relationship therebetween such that $n^{th}$ and $(n+a)^{th}$ heads are electrically connected to each other, $(n-1)^{th}$ and $(n+a-1)^{th}$ heads are electrically connected to each other, $(n-2)^{th}$ and $(n+a-2)^{th}$ heads are electrically connected to each other, and so on, wherein "n" is the order of a head immediately adjacent to said geometrical center, counted from a head at one end, and "a" is a positive integer; and   (c) a plurality of reproducing heads, the head gaps of which are aligned transversely with respect to the direction of the movement of said magnetic medium; said reference signal being reproduced via two of said reproducing heads arranged to scan said reference tracks; two heads for each bit, which are located at opposite sides with respect to said geometrical center, being arranged to scan said two information tracks, and being electrically connected to each other for adding vectorally reproduced a.c. signals having variable magnitude and phase angle characteristics; said plurality of bits being respectively reproduced by said reproducing heads in synchronization with a synchronous signal which is produced in accordance with said reference signal.

3. In a system of recording and reproducing a plurality of bits of a digital signal on a plurality of tracks positioned in parallel on a magnetic medium arranged to slide on at least one multi head which includes a plurality of like heads transversely aligned with respect to the direction of the movement of said magnetic medium, each of said heads being spaced from an adjacent head by less than dust speck size, each head having a head gap which defines the width of each track, a method of simultaneously reducing skew and dropout comprising steps of:

simultaneously recording with a common polarity each of said bits via two heads of said multi head in such a manner that each bit is recorded on two information tracks, said two information tracks for each bit being positioned at opposite sides with respect to a reference track on which a reference signal is recorded, said reference signal being recorded via one of said heads, said reference signal being utilized for producing a synchronous signal with which said plurality of bits are reproduced in synchronization, said two information tracks for each bit being spaced from each other by more than a predetermined distance corresponding to said dust speck size to eliminate drop out to a possibility of a dust speck occurring simultaneously on the same information tracks carrying the same bit signal and being spaced from the reference track respectively by the distances A and B satisfying the relationship $\frac{1}{3}B < A < 3B$ to reduce skew, some of said plurality of tracks which are located in the vicinity of said reference track, being arranged such that said two information tracks for each bit are spaced apart by a constant distance, and having a relationship therebetween such that a first bit signal is recorded on $(n-1)^{th}$ and $(n+a)^{th}$ tracks, a second bit signal is recorded on $(n-2)^{th}$ and $(n+a-1)^{th}$ tracks, a third bit signal is recorded on $(n-3)^{th}$ and $(n+a-2)^{th}$ tracks, and so on, wherein "n" is the order of said reference track counted from one end of said magnetic medium, and "a" is a positive integer;

reading each bit recorded on each track via each of said heads so that each of said heads produces an a.c. signal having a variable magnitude and phase angle characteristic; and adding vectorally said a.c. signals from said two heads which correspond to said two information tracks.

4. A method of recording and reproducing a plurality of bits of a digital signal as claimed in claim 3, wherein said step of recording comprises, recording said at least one bit on a plurality of tracks which are spaced from each other by at least 500 μm.

5. A method of recording and reproducing a plurality of bits of a digital signal as claimed in claim 3, wherein said step of recording comprises, recording one bit of a word as said reference signal.

6. A method of recording and reproducing a plurality of bits of a digital signal as claimed in claim 5, wherein said one bit of a word is a most significant bit.

7. An apparatus for recording and reproducing a plurality of bits of a digital signal on and from a magnetic medium wherein drop out and skew are simultaneously reduced, comprising:

(a) means for driving said magnetic medium at a predetermined speed;

(b) a plurality of like recording heads the head gaps of which are aligned transversely with respect to the direction of the movement of said magnetic medium, each of said heads being spaced from an adjacent head by less than dust speck size, each of said head gaps defining the width of each track; a reference signal being recorded via one of said recording heads on a reference track; each of said plurality of bits being recorded via two of said recording heads which are located at opposite sides with respect to said one head via which said reference signal is recorded, said two of said recording heads being electrically connected to each other for recording the same common polarity bit on two information tracks on said magnetic medium, said two heads being spaced from each other by more than a predetermined distance corresponding to said dust speck size to eliminate drop out due to a possibility of a dust speck occurring simultaneously on the same information tracks carrying the same bit signal and being spaced from the reference track respectively by the distances A and B satisfying the relationship $\frac{1}{3}B < A < 3B$ to reduce skew, some of said plurality of heads, which are located in the vicinity of said one head via which said referenced signal is recorded, being arranged such that two heads for each bit are spaced apart by a constant distance, and having a relationship therebetween such that $(n-1)^{th}$ and $(n+a)^{th}$ heads are electrically connected to each other, $(n-2)^{th}$ and $(n+a-1)^{th}$ heads are electrically connected to each other, $(n-3)^{th}$ and $(n+a-2)^{th}$ heads are electrically connected to each other, and so on, wherein "n" is the order of said one head, via which said reference signal is recorded, counted from a head at one end, and "a" is a positive integer; and (c) a plurality of reproducing heads, the head gaps of which are aligned transversely with respect to the direction of the movement of said magnetic medium; said reference signal being reproduced via one of said reproducing heads arranged to scan said reference track; two heads for each bit, which are located at opposite sides with respect to said one head via which said reference signal is reproduced, being arranged to scan said two information tracks, and being electrically connected to each other for adding vectorally reproduced a.c. signals having variable magnitude and phase characteristics; said plurality of bits being respectively reproduced by said reproducing heads in synchroniaation with a synchronous signal which is produced in accordance with said reference signal.

8. An apparatus as claimed in claim 7, wherein each of said two reproducing heads is spaced on either side of said at least one head by said first and second distances A and B, respectively.

9. An apparatus as claimed in claim 7, wherein said recording heads include a plurality of first recording heads and a plurality of second recording heads respectively arranged symmetrically with respect to a midway point of said recording heads; and wherein said reproducing heads include a plurality of third recording heads and a plurality of fourth reproducing heads respectively arranged symmetrically with respect to the midway point of said recording heads.

10. An apparatus as claimed in claim 7, wherein each of said recording heads electrically connected to each other are spaced from each other by more than 500 μm; and wherein said reproducing heads electrically connected to each other are spaced from each other by the same distance as said recording heads are spaced.

* * * * *